(12) United States Patent
Dorn et al.

(10) Patent No.: US 7,742,593 B2
(45) Date of Patent: Jun. 22, 2010

(54) TELEPHONE HANDSET FOR A BROADBAND TELECOMMUNICATION SYSTEM

(75) Inventors: Dieter Dorn, Bad Vilbel (DE); Kurt Brunsfeld, Eschborn/Ts. (DE); Hans-Ulrich Eckard, Darmstadt (DE)

(73) Assignee: Avaya GmbH & Co. KG (DE)

( * ) Notice: Subject to any disclaimer, the term of this patent is extended or adjusted under 35 U.S.C. 154(b) by 219 days.

(21) Appl. No.: 12/119,347

(22) Filed: May 12, 2008

(65) Prior Publication Data

US 2008/0310618 A1  Dec. 18, 2008

(30) Foreign Application Priority Data

Jun. 12, 2007 (DE) .................. 10 2007 027 625

(51) Int. Cl.
*H04M 1/00* (2006.01)
*H04M 9/00* (2006.01)

(52) U.S. Cl. .............................. 379/428.01; 379/433.01; 455/575.1

(58) Field of Classification Search ............... 379/419, 379/428.01, 433.01, 433.02, 433.03; 455/90.3, 455/575.1
See application file for complete search history.

(56) References Cited

U.S. PATENT DOCUMENTS

| 6,374,120 | B1 | 4/2002 | Krauss |
| 6,728,386 | B1 | 4/2004 | Andersen |
| 6,990,197 | B2 | 1/2006 | Wong et al. |

FOREIGN PATENT DOCUMENTS

| JP | 236546 | 8/1992 |
| JP | 04/363717 | 12/2004 |
| WO | WO 00/21330 | 4/2000 |
| WO | WO 2007/060730 | 5/2007 |

OTHER PUBLICATIONS

Background of the Invention for the above-captioned application (previously provided).

*Primary Examiner*—Tuan D Nguyen
(74) *Attorney, Agent, or Firm*—Sheridan Ross P.C.

(57) ABSTRACT

A telephone handset for a broadband telecommunication system, whose housing is composed of an upper shell and a lower shell forming a joining edge, shall guarantee a reliable coupling of the resonance volume to the free field with a particularly low sound leakage. For this purpose, the joining edge is provided according to the invention with a number of coupling slots.

6 Claims, 1 Drawing Sheet

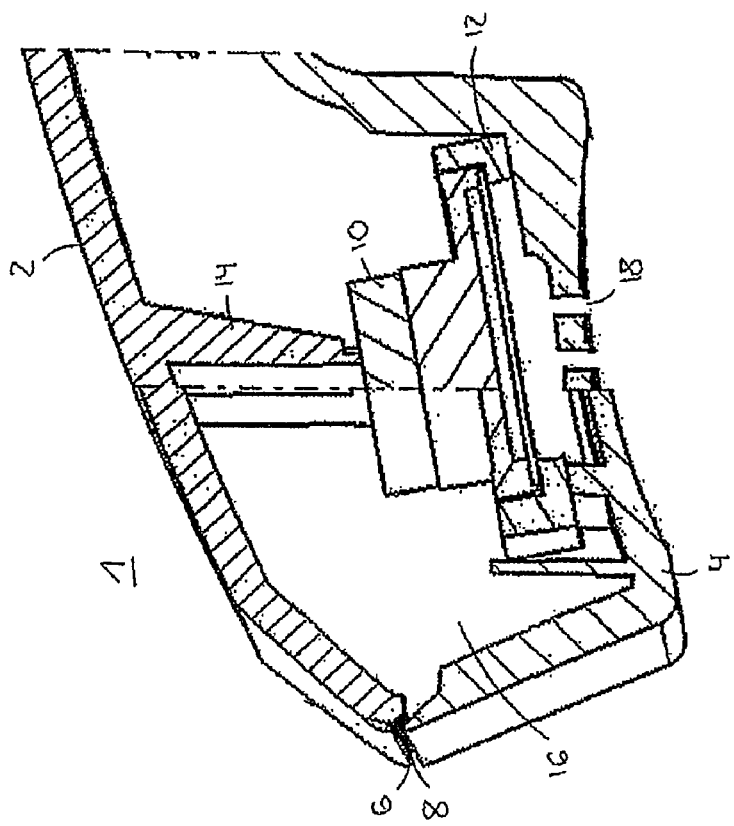
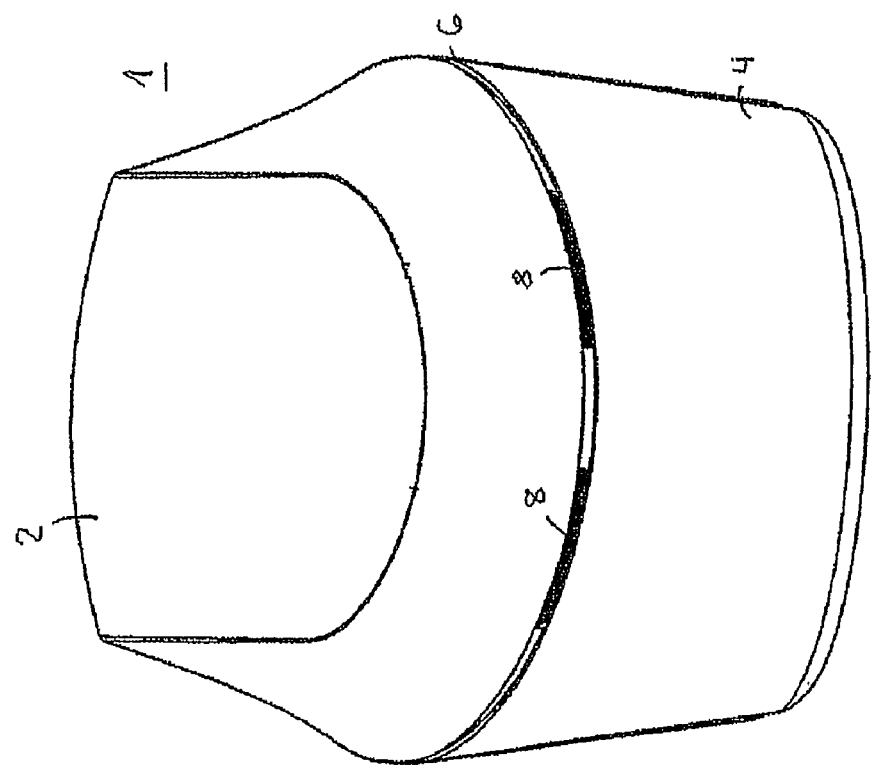

TELEPHONE HANDSET FOR A BROADBAND TELECOMMUNICATION SYSTEM

FIELD

The invention relates to a telephone handset for a broadband telecommunication system whose housing is composed of an upper shell and a lower shell forming a joining edge.

BACKGROUND

Telephone terminals connected to a broadband telecommunication system are usually provided with handsets, connected directly or cordlessly, which can send voice messages to, and receive them from, a user. For this purpose, such handsets are usually provided with integrated microphones for receiving the voice message and with loudspeakers for transmitting such a voice message to the user, which are arranged in a common housing of the handset. For reasons of production technique, this housing is usually composed of an upper shell and a lower shell forming a so-called joining edge, i.e. substantially of two housing halves.

To obtain a particularly good sound spectrum in the transmission of a voice message to the user, a resonance volume is usually provided inside the telephone handset in the area of the loudspeaker, because the acoustic signal of the voice message is amplified by resonance in the corresponding frequencies, in dependency of the volume available and in particular of the latter's spatial dimension, and is, therefore, more clearly perceptible to the user. The limited resonance volume in handsets, due to their construction, also limits the frequency range amplified by the resonance and, therefore, also the acoustically perceptible transmission quality of the system. The lower limit of the signal frequencies which can be transmitted well in this way is, therefore, for the usual dimensions of handsets, approximately 400 Hz.

To cover, however, the total frequency spectrum perceptible to the human hearing, which extends on the side of the deep frequencies down to frequencies of approx. 1 Hz, particularly well on the transmission side, in order to achieve a better hearing and transmission quality, handsets of the usual construction are provided with a number of coupling slots. These coupling slots connect the resonance volume inside the telephone handset with the free field outside the telephone handset. This coupling of the resonance volume with the outer air space makes it possible to enlarge the resonance volume in a simple manner. In this way, it is achieved that the frequency range below 400 Hz can also be reproduced or transmitted in an amplified manner, so that a particularly good sound of the voice message can be generated by the loudspeaker. For a reliable coupling with the free field, the coupling slots are usually arranged on the back of the telephone handset. Depending on the application, the handset back can alternatively even be of a completely open design to enable a maximum coupling of the free field. Depending on the configuration of the coupling slots and the coupling they achieve, an amplification of the frequency range down to 100 Hz or even down to 20 Hz can be achieved.

However, the provision of openings on the back of the telephone handset does not only restrict the generally desirable freedom of design in the optical configuration of the handsets, but also the comfort and the immunity from eavesdropping during the operation of such handsets for broadband telecommunication systems. Especially in view of the immunity from eavesdropping, the openings on the back of the telephone handset and the resultant undesired simple radiation of the sound, i.e. the sound leakage into the free field, can cause considerable restrictions. For example, in installations in call centers, this leads to an increased annoyance caused by noise and to an undesired eavesdropping on the part of third parties during confidential conversations.

SUMMARY

Therefore, the invention is based on the task to provide a telephone handset for broadband telecommunication of the above-mentioned type guaranteeing a reliable coupling of the resonance volume to the free field and, at the same time, a particularly low sound leakage.

This task is solved according to the invention by providing the joining edge with a number of coupling slots.

The invention is based on the consideration that for the use of a handset for broadband telecommunication, i.e, with a particularly wide frequency spectrum of the transmission, the external field of such handset should in any case be acoustically coupled to the resonance volume inside the telephone handset. For this purpose, the design of the handset should in any case maintain suitable openings through which a sound-conducting connection of the resonance volume with the external field is established. To limit the sound leakage through the back of the telephone handset, these openings should, however, be situated at positions of the telephone handset which do not further a sound leakage through the back of the telephone handset. As this requirement is freely fulfilled anyhow by the joining edge of the telephone handset, which is formed when the upper and lower shells are plugged together, the coupling slots, which acoustically couple the external field with a hollow space inside the telephone handset, are shifted into this joining edge.

In a preferred embodiment, these coupling slots are arranged near the loudspeaker, i.e. on the top side of the telephone handset, because then, they are in direct connection with the resonance volume inside the telephone handset. In addition, the risk that the coupling slots in the joining edge are covered, for example by the user's hands, thus impairing the acoustic coupling of the external field to the resonance volume inside the telephone handset, is kept particularly low.

The passage area of the coupling slots is preferably chosen such that the coupling to the free field fulfills the requirements imposed on the frequency spectrum to be amplified. The width of the coupling slots preferably extends over the entire width of the joining edge, so that the latter is completely used for the coupling slots, the length of the coupling slots being preferably adapted to the required passage area.

In order to particularly reduce in the simplest possible manner the production expenditure in the manufacture of the upper and lower shells used for the telephone handset and to increase the flexibility, the coupling slots are in a further advantageous embodiment arranged symmetrically to an axis of symmetry of the telephone handset. It is thus achieved that the way in which the telephone handset is used, i.e., for example, whether it is held by the left or by the right hand, has only little influence on the functionality of the coupling slots.

The advantages achieved with the invention consist in particular in the fact that due to the arrangement of the coupling slots in the joining edge of the housing, the leakage sound is particularly low and that at the same time the coupling of the acoustic free field with the resonance volume inside the telephone handset is still guaranteed. Especially the undesired emission of sound waves through openings on the back of the handset and the resulting lack of immunity from eavesdropping is, therefore, reduced in a particularly simple manner. Furthermore, the use of openings as coupling slots in the joining edge does not substantially limit the freedom of design, which may be important for the manufacturers of such handsets, and it avoids undesired optical flaws, both on the manufacturers' side and on the buyers' side.

BRIEF DESCRIPTION OF THE DRAWINGS

FIG. 1 shows the top side of a handset for broadband telecommunication,

FIG. 2 is a longitudinal section through the top side of a handset for broadband telecommunication.

Identical parts are marked with the same reference numbers in the two figures.

DETAILED DESCRIPTION

The telephone handset 1 according to FIG. 1 is part of a broadband telecommunication system connected with a plurality of terminals and is provided for transmission and reception of voice messages, as required. The telephone handset 1 is connected with an allocated terminal directly or cordlessly. As is evident from the drawing of FIG. 1, the housing of the telephone handset 1 is composed of an upper shell 2 and a lower shell 4, which are fastened to one another through a plugin connection inside the telephone handset 1. A narrow joining edge 6 formed by plugging the upper shell 2 and the lower shell 4 together extends on the outside of the telephone handset 1 and surrounds it once.

The lower shell 4 of the telephone handset 1 includes in a type of construction known it itself, among others, outlets for a microphone arranged inside the telephone handset 1 and a loudspeaker unit, arranged spatially separated from one another. In spatial vicinity of the loudspeaker, a hollow body is arranged inside the telephone handset, serving as a resonance volume for the emitted sound waves. This resonance volume amplifies the emitted sound waves and improves the sound of the voice message. As due to the constructionally restricted volume, preferably the high frequencies of the sound waves are amplified, whereas for a good sound quality and true reproduction in the transmission of voice messages, the deeper frequencies also play an important part, a number of coupling slots 8 are arranged on the telephone handset. These slots couple the external free field with the resonance volume inside the telephone handset 1, enabling in this way the amplification of the lower frequencies and a particularly good sound of the voice message. In the usual type of construction, the coupling slots 8 are, however, arranged on the back of the telephone handset 1 and, therefore, involve a risk in view of the immunity from eavesdropping because sound waves can undesirably be emitted into the external free field through the coupling slots 8 via the back of the telephone handset 1.

Contrary to that, the telephone handset according to FIG. 1 is specifically designed for keeping such sound leakages particularly low, in spite of a sufficiently high acoustic coupling of the resonance volume to the outer space. For this purpose, the coupling slots 8 of the telephone handset 1 according to FIG. 1 are specifically arranged in the joining edge 6 of the housing. This aggravates the undesired emission of the sound waves via the back of the telephone handset 1. Furthermore, the coupling slots 8 are optically hidden through their arrangement in the joining edge 6 and, therefore, leave the developers a particularly high freedom of design. The coupling slots 8 illustrated in FIG. 1 are arranged symmetrically to the longitudinal axis, i.e., the axis extending from the center of the bottom side to the center of the top side through the geometrical center point of the telephone handset 1. This increases the flexibility of use of such handsets 1.

The width of the coupling slots 8 is limited through the width of the joining edge, but their length can be adapted for an optimum coupling of the acoustic free field. Thus, with an average joining edge of approx. 2 mm, the preferred length of the coupling slots will be approx. 12 mm, In this way, an amplification of the frequencies down to 100 Hz can be achieved.

FIG. 2 shows a longitudinal section of the top side of the telephone handset 1 for broadband telecommunication. In the top side of the telephone handset, a loudspeaker unit 10 for reproducing incoming acoustic signals is positioned in a loudspeaker holder 12. The loudspeaker unit 10 is pushed into the loudspeaker holder and held in it, when the upper shell 2 and the lower shell 4 of the telephone handset 1 are plugged together, by means of a holding web 14 formed integrally with the upper shell 2 and extending into the interior of the telephone handset. The joining edge 6, which is formed when the upper shell 2 and lower shell 4 are plugged together, comprises a coupling slot 8 which connects a back-space volume 16 limited by the upper shell 2 and lower shell 4 with the outer space.

During operation of the telephone handset 1, the backspace volume 16 serves as a resonance volume for the loudspeaker unit 10, for amplification of the sound waves emitted through the outlets 18. Through the specific arrangement of the coupling slots 8 in the joining edge 6, the acoustic free field is coupled to the backspace volume, thus enlarging the resonance volume. By coupling the outer space to the backspace volume, deeper frequencies can also be amplified and a particularly good sound of the voice message can be achieved, which would not be pace volume alone as resonance volume.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

LIST OF REFERENCE NUMBERS

1 Telephone handset
2 Upper shell
4 Lower shell
6 Joining edge
8 Coupling slot
10 Loudspeaker unit
12 Loudspeaker holder
14 Holding web
16 Back-space volume
18 Outlets

What is claimed is:

1. Telephone handset for a broadband telecommunication system, whose housing is composed of an upper shell and a lower shell, forming a joining edge, said joining edge being provided with a number of coupling slots, wherein the coupling slots are provided on the top side of the telephone handset.

2. Telephone handset according to claim 1, wherein the length of the coupling slots is chosen in such a way that they possess an opening surface sufficient for an application.

3. Telephone handset according to claim 1, wherein the coupling slots are arranged symmetrically to an axis of symmetry of the telephone handset.

4. A telephone handset, comprising: a housing composed of an upper shell and a lower shell, the upper and lower shells forming a joining edge, the joining edge having a plurality of coupling slots, the coupling slots being provided on the top side of the telephone handset.

5. The telephone handset according to claim 4, wherein the length of the coupling slots is chosen in such a way that they possess an opening surface sufficient for an application.

6. The telephone handset according to claim 4, wherein the coupling slots are arranged symmetrically to an axis of symmetry of the telephone handset.

* * * * *